United States Patent Office 3,246,020
Patented Apr. 12, 1966

3,246,020
3-HALO-ANDROSTA-1,3,5-TRIENES AND PROCESS OF PREPARING THE SAME
George W. Moersch, Ann Arbor, Mich., assignor to Parke, Davis & Company, Detroit, Mich., a corporation of Michigan
No Drawing. Filed Apr. 22, 1963, Ser. No. 274,867
8 Claims. (Cl. 260—397.3)

The present invention relates to novel steroid compounds and to methods for their production. More particularly, it relates to 3-halo-androsta-1,3,5-triene compounds having the formula

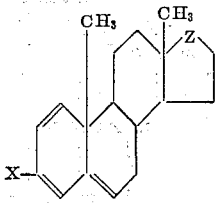

(I)

where X represents a bromine or chlorine atom and Z represents

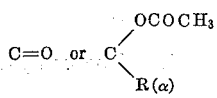

where R($\alpha$) is a lower alkyl radical, preferably methyl.

In accordance with the invention, compounds having Formula I are prepared by the reaction of androsta-1,4-dien-3-one compounds of the formula

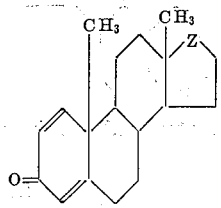

(II)

with oxalyl bromide or oxalyl chloride in an inert organic solvent. In Formula II, Z has the same significance as in Formula I. Suitable solvents for the reaction are hydrocarbons, such as benzene, toluene, xylene, cyclohexane, and isooctane; ethers, such as diethyl ether and tetrahydrofuran; and mixtures of these. It is not desirable to use a chlorinated hydrocarbon, such as chloroform, in this reaction. Care should be taken also to omit from the reaction mixture any acid, such as oxalic acid, which might result from hydrolysis of the oxalyl halide if anhydrous conditions are not carefully maintained. The presence of acid in the reaction mixture may undesirably lead either to aromatization of the A ring or to hydrolysis back to the starting dienone. Equimolar amounts of reactants may be used; it is preferable, however to employ the oxalyl halide in small excess, up to 5-molar. The duration of the reaction may be varied over a wide range, depending on the temperature employed. For the preparation of the 3-halo-17$\beta$-acetoxy-17$\alpha$-lower alkyl-androsta-1,3,5-triene compounds, it is preferable to carry out the reaction at room temperature for a period not greater than 2 hours. To prepare the 3-halo-17-keto-androsta-1,3,5-triene compounds the reaction may be run for as long as 24 hours at room temperature. In either case, it is desirable to cool the solution containing the androsta-1,4-diene-3-one-starting material to a temperature in the range of −50° C. to 0° C. prior to adding the oxalyl halide; the reaction mixture may then be warmed to 20° C.–50° C. to carry the reaction to completion.

The androsta-1,4-dien-3-one compounds of the formula

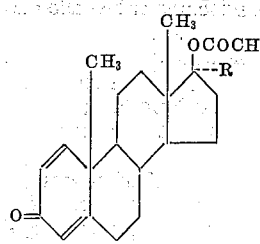

(III)

which are used as starting materials in the foregoing process, are prepared by the reaction of 17$\beta$-hydroxyandrosta-1,4-dien-3-one compounds of the formula

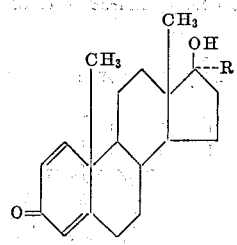

(IV)

with acetyl chloride or acetic anhydride; where R is a lower alkyl radical. The 17$\beta$-hydroxyandrosta-1,4-dien-3-one compounds of Formula IV are prepared by reaction of 17$\beta$-hydroxyandrosta-4-en-3-one compounds of the formula

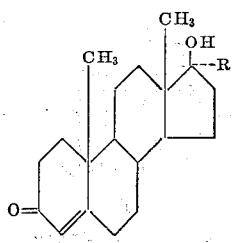

(V)

with 2,3-dichloro-5,6-dicyano-1,4-benzoquinone.

In accordance with a second process, compounds of the invention having the formula

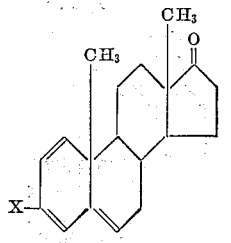

(VI)

are prepared by the reaction of 1,3-dihaloandrosta-3,5-diene compounds of the formula

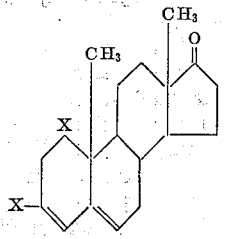

(VII)

with a base; where X is a bromine or chlorine atom. Bases which may be used are alkali metal hydroxides, such as potassium hydroxide; alkali metal alkoxides, such as sodium methoxide; alkali metal carbonates, such as potassium carbonate; alkali metal carboxylates, such as sodium acetate; and organic nitrogen bases, such as collidine. Suitable solvents for use with the alkali metal bases are the lower aliphatic alcohols, such as methanol, ethanol, and isopropanol, and aqueous mixtures of these. An excess of base in lieu of a solvent may be added when an organic nitrogen base is employed. The base is preferably used in slight excess. The reaction may best be carried out at the reflux temperature of the solvent during the period of 5–45 minutes. Somewhat lower temperatures with correspondingly longer reaction times may also be employed, however.

The 1,3-dihaloandrosta-3,5-diene compounds of Formula VII, which are the starting materials employed in the foregoing process, can be prepared by the reaction of androsta-1,4-dien-3-one compounds of Formula II with a hydrogen halide in an inert solvent, such as diethyl ether, at 0–5° C., followed by reaction of the crude intermediate with a mixture of oxalyl halide and oxalic acid in an inert hydrocarbon solvent, such as benzene. Oxalic acid may be used in this procedure since the 1,3-dihaloandrosta-3,5-diene compounds are stable to small amounts of acidic reagents.

The compounds of the invention are useful as pharmacological agents and as chemical intermediates. As pharmacological agents they exhibit myotropic activity accompanied by a low degree of androgenicity. They are active upon oral administration. As chemical intermediates they may be converted to 1-halo-4-methylestra-1,3,5(10)-triene compounds by reaction with an oxalyl halide.

The invention is illustrated by the following examples:

*Example 1*

A solution of 2.0 g. of androsta-1,4-dien-3,17-dione in 100 ml. of dry benzene is cooled in a Dry Ice bath, 3 ml. of oxalyl chloride is added, and the reaction mixture is kept at room temperature for 24 hours. The mixture is then evaporated to dryness under reduced pressure, and the residue is triturated with a saturated aqueous sodium bicarbonate solution. The solid 3-chloroandrosta-1,3,5-trien-17-one obtained is isolated by filtration, washed with water, dried, and crystallized from methanol; M.P. 163° C.

*Example 2*

A solution of 1.0 g. of 17α-ethyl-17β-acetoxy-androsta-1,4-dien-3-one in 25 ml. of dry benzene is cooled in a Dry Ice bath, 6 ml. of oxalyl chloride is added, and the reaction mixture is kept at room temperature for 2 hours. The mixture is then evaporated to dryness under reduced pressure, the residue is triturated with a saturated aqueous sodium bicarbonate solution, and the 3-chloro-17α-methyl-17β-acetoxyandrosta-1,3,5-triene obtained is isolated, washed with water, dried, and crystallized from acetone-methanol; M.P. 172–174° C.

In the foregoing procedure, 1.0 g. of 17α-ethyl-17β-acetoxyandrosta-1,4-dien-3-one may be substituted for 17α-methyl-17β-acetoxyandrosta-1,4-dien-3-one to prepare 3-chloro-17α-ethyl-17β-acetoxyandrosta-1,3,5-triene. The 17α-ethyl-17β-acetoxyandrosta-1,4-dien-3-one used as starting material is prepared in the following manner: A solution of 6.22 g. of 17α-ethyl-17β-hydroxyandrost-4-en-3-one in 100 ml. of acetic anhydride is heated under reflux for 2½ hours. The solution is then evaporated to near-dryness under reduced pressure, and the residue is triturated twice with warm methanol, evaporated to dryness, and crystallized from methanol to give 17α-ethyl-17β-acetoxyandrost-4-en-3-one, M.P. 152–153° C. This product (4.0 g.) is dissolved in 50 ml. benzene together with 3.2 g. of 2,3-dichloro-5,6-dicyano-1,4-benzoquinone, and the solution is heated under reflux for 9½ hours. The solution is cooled, 50 ml. of ether is added, and the resulting mixture is filtered. The filtrate is washed, first with 2 N sodium hydroxide solution and then with water, dried over anhydrous magnesium sulfate, and evaporated to dryness to give 17α-ethyl-17β-acetoxyandrosta-1,4-dien-3-one, M.P. 139–141° C., after crystallization from acetone-n-hexane and recrystallization from n-hexane.

*Example 3*

A solution of 1.0 g. of 1,3-dibromoandrosta-3,5-dien-17-one in 40 ml. of 2% methanolic potassium hydroxide is refluxed in a nitrogen atmosphere for 5 minutes. The solution is then cooled to 0° C., and the 3-bromoandrosta-1,3,5-trien-17-one which crystallizes is isolated by filtration, washed with water, and dried; M.P. 164–165° C.

The 1,3-dibromoandrosta-3,5-dien-17-one used as starting material in the above procedure is prepared as follows: A solution of 2.0 g. of androsta-1,4-dien-3,17-dione in 155 ml. of anhydrous ether is cooled in an ice bath while hydrogen bromide is bubbled through the solution for 15 minutes. The mixture is kept at 0–5° C. for ten minutes more, and is then evaporated to dryness under reduced pressure. The yellow residue is dissolved in 175 ml. of dry benzene, and to the solution is added 0.6 g. of oxalic acid dihydrate and 6 ml. of oxalyl bromide. The mixture is stirred at 25° C. for 3.5 hours, purified by filtration, and the filtrate is evaporated to dryness under reduced pressure. The residue is dissolved in ether, and the ether solution is washed, first with saturated aqueous sodium bicarbonate, then with water, and dried over anhydrous magnesium sulfate. The dried solution is evaporated to dryness under reduced pressure to give 1,3-dibromoandrosta-3,5-dien-17-one, M.P. 205–207° C., after crystallization from methanol.

I claim:
1. 3-halo-androsta-1,3,5-triene compounds of the formula

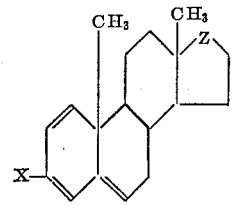

where X is a halogen atom and Z is chosen from the class consisting of

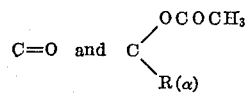

where R(α) is lower alkyl.

2. 3-chloroandrosta-1,3,5-trien-17-one.
3. 3-chloro-17α-methyl-17β-acetoxyandrosta-1,3,5-triene.
4. 3-bromoandrosta-1,3,5-trien-17-one.
5. Process for the production of 3-haloandrosta-1,3,5-triene compounds of the formula

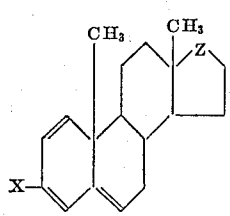

which comprises the reaction of androsta-1,4-dien-3-one compounds of the formula

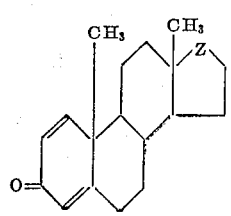

with an oxalyl halide in an inert organic solvent; where X is a halogen atom and Z is chosen from the class consisting of

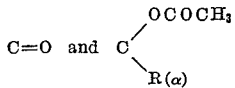

where R(α) is lower alkyl.

6. Process for the production of 3-chloro-17α-methyl-17β-acetoxyandrosta-1,3,5-triene which comprises the reaction of 17α-methyl-17β-acetoxyandrosta-1,4-dien-3-one with oxalyl chloride in an inert organic solvent.

7. Process for the production of 3-haloandrosta-1,3,5-triene compounds of the formula

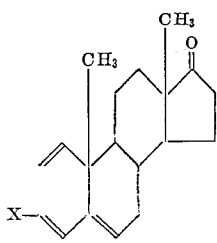

which comprises the reaction of 1,3-dihaloandrosta-3,5-diene compounds of the formula

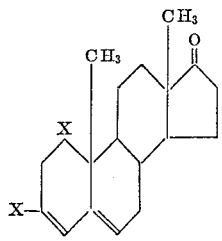

with a base; where X is a halogen atom

8. Process for the production of 3-bromoandrosta-1,3,5-trien-17-one which comprises the reaction of 1,3-dibromoandrosta-3,5-dien-17-one with an alkali metal hydroxide.

No references cited.

LEWIS GOTTS, *Primary Examiner.*